Oct. 16, 1951 — J. B. PARSONS — 2,571,379
FLUID CONDUIT DEVICE FOR VEHICLE DOORS
Filed Aug. 20, 1948
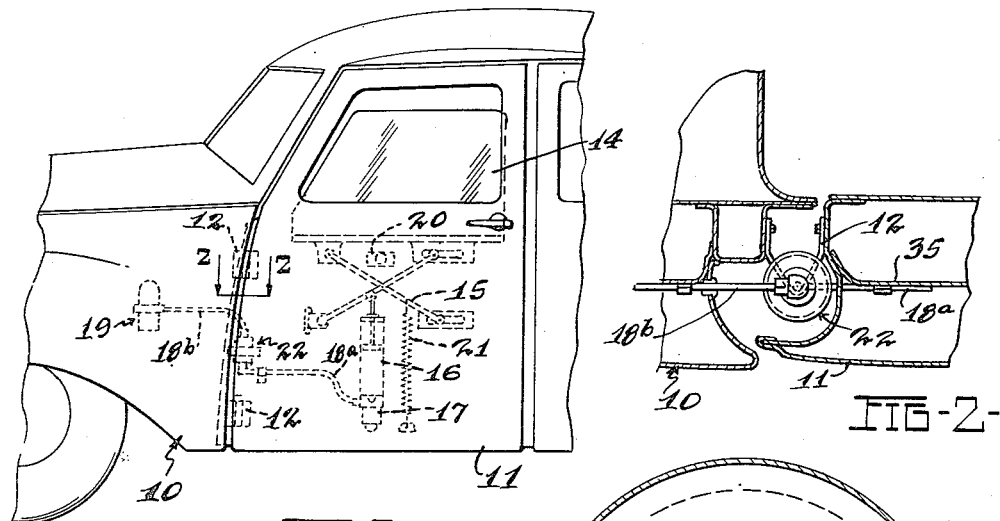
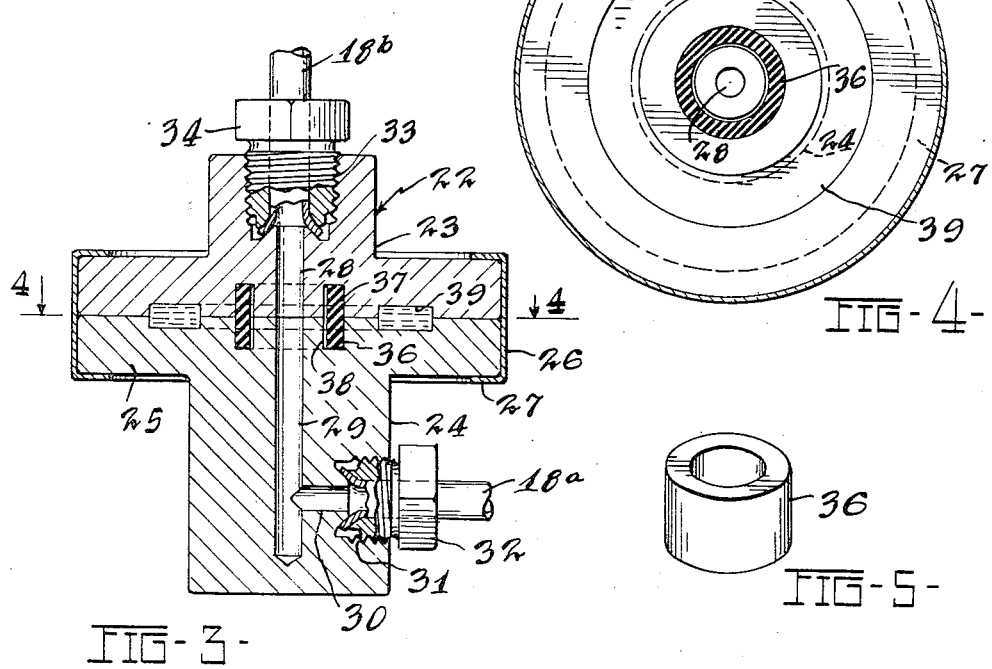
INVENTOR.
JOHN B. PARSONS
ATTY Patented Oct. 16, 1951

2,571,379

UNITED STATES PATENT OFFICE 2,571,379

FLUID CONDUIT DEVICE FOR VEHICLE DOORS

John B. Parsons, Maumee, Ohio

Application August 20, 1948, Serial No. 45,380

3 Claims. (Cl. 296—44)

This invention relates to the conducting of fluids and particularly liquids under pressure between two relatively movable parts such, for example, as between a vehicle door frame and a hingedly mounted door.

Heretofore, in automobiles equipped with fluid operated means for actuating the windows in the vehicle doors, considerable difficulty has been encountered in conducting the fluid under pressure from the body or door frame into the door through the hingedly mounted edge portion. Flexible rubber tubes have been used for this purpose, and although devices have been employed for protecting the tube against injury, not infrequently improper installation or repeated opening and closing of the door over an extended period have resulted in rupturing the tube, causing it to leak or otherwise impair the efficient operation of the installation. It is a desideratum to provide the automobile with a fluid conduit which in spite of repeated door opening and closing movements, will operate efficiently and satisfactorily over an extended period of time without leakage or the necessity of intermittent inspection.

An object is to produce a fluid conducting device particularly adapted for liquids which is interposed in the region of the hinged door mounting and which operates satisfactorily to conduct the liquid or other fluid under pressure from the body to the door or vice versa and is so designed as to militate against leakage, is relatively inexpensive to manufacture and install, is self-sealing and otherwise is free from objections and difficulties inherent in the use of flexible tubing heretofore employed for the purpose.

Other objects and advantages will hereinafter appear, and for purposes of illustration but not of limitation, an embodiment of the invention is shown in the accompanying drawings, in which Figure 1 is a fragmentary side elevation, somewhat diagrammatic, illustrating a hydraulic window regulator and illustrating the fluid conducting device disposed in the region of the hinged mounting for the vehicle door;

Figure 2 is an enlarged transverse sectional view on the line 2—2 of Figure 1;

Figure 3 is a vertical sectional elevation of the fluid or liquid conducting device;

Figure 4 is a transverse sectional view substantially on the line 4—4 of Figure 3; and Figure 5 is a perspective view of the rubber-like sealing annulus or gasket interposed between the relatively rotating parts of the fluid conducting device.

The illustrated embodiment of the invention comprises an automobile 10 having a side door 11 which is mounted for opening and closing movements by means of a pair of hinges 12, affording the connection between the door and the automobile body to enable swinging of the door upon an up and down axis. The door 11 has a window opening 13 which is adapted to be covered by a window glass or panel 14. The window glass 14 is actuated in this instance by a hydraulic regulator which includes a cross arm regulator 15 to which is connected a piston and cylinder assembly 16. In the lower end of the cylinder is a solenoid controlled valve indicated at 17. Liquid is introduced to the cylinder by a tube 18a disposed in the door and which is connected to a tube 18b in the body communicating with an electric motor pump assembly 19.

On the inside of the door is disposed a control switch 20 which when actuated to one position, energizes the pump unit 19 as well as the solenoid valve 17 thereby to force liquid under pressure through the tubes 18b and 18a to force the piston of the piston and cylinder assembly 16 upwardly, thereby to move the window panel 14 toward its closed position. Upon actuation of the switch 20 to the other position, only the solenoid 17 is energized to open the valve and thereby allow the coil spring 21 which has previously been tensioned, to pull the cross arm regulator 15 and then the window, downwardly, forcing the liquid beneath the piston back into the reservoir which also forms a part of the motor pump unit 19. Reference is hereby made to my United States Patent No. 2,436,728, dated February 24, 1948, for a more complete description of the structure and operation of the above hydraulic regulator mechanism. Since that structure forms no part of the present invention, further illustration and description are not considered necessary.

Heretofore, the tubes 18b and 18a were, in the main, of rubber-like material and guide devices were employed to direct the tubing from the body to the door, but these devices have not proved entirely satisfactory and have been a source of considerable trouble and annoyance. In accordance with this invention, what might be termed a fluid hinge, generally indicated at 22, is interposed as best shown on Figure 2, between the door 11 and the automobile body 10 and comprises a pair of die castings 23 and 24, each having an outwardly extending annular flange 25 formed with substantially flat faces in abutment with each other. The two parts are held together by means of an annular ring 26, the opposite edges of which are crimped inwardly as indicated at 27 and although the ring satisfactorily holds the parts in assembled relation, it is not such as to interfere with the ability of one part to rotate relatively to the other. The part 23 has a central passage 28 which aligns with a passage 29 in the part 24, the latter passage communicating with a lateral passage 30 which terminates in an internally screw-threaded cavity 31 to receive a screw-threaded fitting 32. The tube 18b is secured in place by the fitting 32 and the tube 18a is secured in place by the fitting 32, and in this instance, the tubes 18a and 18b are preferably of metal such, for example, as copper.

It will be observed that the tube 18a is disposed at substantially right angles to the tube 18b at the point of connection to the fluid hinge 22 and these tubes are connected to the door and body parts by suitable clamps 35. Preferably the parts of the fluid hinge 22 are substantially co-axial with the hinges 12 so that when the door is swung upon its hinges, the fluid hinge part 24 rotates relatively to the part 23, it being desirable that there be a gooseneck or coil in the tube 18a to accommodate further opening and closing movements of the door 11.

In order to provide an effective liquid-tight connection between the abutting faces of the fluid hinge parts 23 and 24, a gasket or annulus 36 of rubber-like material is interposed half in a socket 37 in the part 23 and half in a socket 38 in the fluid hinge part 24. The annulus normally fits relatively loosely in the sockets 37 and 38. The annulus 36 is outside of and concentric with the adjacent portions of the passages 28 and 29. It will be understood that liquid under pressure can seep between the abutting faces of the fluid hinge parts and only pressure thus built up will force the walls of the annulus outwardly against the outer walls of the sockets 37 and 38 and thereby militate against any liquid passing outwardly between these faces.

An oil receptacle 39 is formed by annular grooves in each of the parts and constitutes a liquid seal between the rotatable parts. Any of the liquid which may seep beyond the annulus 36 collects in the receptacle 39. It will thus be manifest that the fluid hinge automatically seals itself upon the introduction of liquid under pressure but the seal so established is not sufficient to prevent the rotative movement of one part of the fluid hinge relatively to the other.

It is to be understood that numerous changes in details of construction, arrangement and operation may be effected without departing from the spirit of the invention especially as defined in the appended claims.

What I claim is:

1. In a vehicle body having a hingedly mounted door, a device for conducting liquid under pressure from the body to the door at the hingedly mounted edge portion thereof, said device including a pair of relatively rotatable parts having flat faces in abutment with each other and arranged co-axial with the door hinge, said parts having aligned liquid passages and comprising outwardly extending flanges, means for retaining said parts in assembled relation, said retaining means comprising a flanged ring substantially enclosing said outwardly extending flanges for holding the same in assembled relation, and means responsive to the pressure of the liquid passing through said passages for providing a liquid-tight seal in the region of the abutting faces, and tubes from the body and door connected respectively to the outer ends of said passages.

2. In a vehicle body having a hingedly mounted door, a device for conducting liquid under pressure from the body to the door at the hingedly mounted edge portion thereof, said device including a pair of relatively rotatable parts having flat faces in abutment with each other and arranged co-axial with the door hinge, said parts having aligned liquid passages, means for retaining said parts in assembled relation, and means responsive to the pressure of the liquid passing through said passages for providing a liquid-tight seal in the region of the abutting faces, said liquid-tight seal including a rubber-like gasket, a portion of which is socketed in each of said parts, said gasket being yieldable under pressure of the liquid passing through the aligned passages for establishing a seal between the relatively rotatable parts, a liquid seal between said rotatable parts outside of and concentric with said rubber-like gasket, and tubes from the body and door connected respectively to the outer ends of said passages.

3. In a vehicle body having a hingedly mounted door, a device for conducting liquid under pressure from the body to the door at the hingedly mounted edge portion thereof, said device including a pair of relatively rotatable parts having flat faces in abutment with each other and arranged co-axial with the door hinge, said parts having aligned liquid passages, means for retaining said parts in assembled relation, and means responsive to the pressure of the liquid passing through said passages for providing a liquid-tight seal in the region of the abutting faces, said last means comprising a rubber-like gasket and gasket-receiving sockets in adjacent parts respectively slightly larger than the gasket, said gasket being yieldable under pressure of liquid passing through the aligned passages, and tubes from the body and door connected respectively to the outer ends of said passages.

JOHN B. PARSONS.

REFERENCES CITED

The following references are of record in the file of this patent:

UNITED STATES PATENTS

| Number | Name | Date |
|---|---|---|
| 1,020,839 | Niesen | Mar. 19, 1912 |
| 1,375,612 | Seurin | Apr. 19, 1921 |